US012711678B2

(12) United States Patent
Zhu et al.

(10) Patent No.: US 12,711,678 B2
(45) Date of Patent: Aug. 18, 2026

(54) FAST PERSONALIZED IMAGE GENERATION USING A MACHINE LEARNING MODEL

(71) Applicant: Lemon Inc., Grand Cayman (KY)

(72) Inventors: Yizhe Zhu, Los Angeles, CA (US); Qing Yan, Los Angeles, CA (US); Xiao Yang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 190 days.

(21) Appl. No.: 18/620,630

(22) Filed: Mar. 28, 2024

(65) Prior Publication Data

US 2025/0308091 A1 Oct. 2, 2025

(51) Int. Cl.

| | |
|---|---|
| ***G06T 11/10*** | (2026.01) |
| ***G06T 7/194*** | (2017.01) |
| ***G06T 11/60*** | (2026.01) |
| ***G06V 10/44*** | (2022.01) |

(52) U.S. Cl.

CPC .............. *G06T 11/10* (2026.01); *G06T 7/194* (2017.01); *G06T 11/60* (2013.01); *G06V 10/44* (2022.01); *G06T 2207/10024* (2013.01); *G06T 2207/20081* (2013.01)

(58) Field of Classification Search

CPC ......... G06T 11/001; G06T 11/60; G06T 5/50; G06T 5/70; G06T 5/60; G06T 2207/20081; G06T 2207/20084; G06T 2207/20221; G06T 2200/24; G06T 2210/36; G06T 2210/32; G06T 7/11; G06T 11/20; G06V 20/70; G06V 10/764; G06V 10/774; G06V 10/82; G06F 40/166; G06F 40/186; G06F 40/40; G06F 16/532; G06F 16/535; G06F 16/58; G06F 16/3334; G06F 3/04845; G06F 3/0482; G06F 3/04847

See application file for complete search history.

(56) References Cited

U.S. PATENT DOCUMENTS

| | | | | |
|---|---|---|---|---|
| 12,198,303 | B1 * | 1/2025 | Paik | G06T 7/11 |
| 12,235,891 | B2 * | 2/2025 | Zhang | G06F 16/3334 |
| 12,271,983 | B2 * | 4/2025 | Zhang | G06T 11/60 |
| 12,430,829 | B2 * | 9/2025 | Xie | G06T 7/11 |
| 12,430,830 | B2 * | 9/2025 | Aberman | G06F 3/04845 |
| 2022/0215534 | A1 * | 7/2022 | Bai | G06T 7/11 |
| 2024/0320789 | A1 * | 9/2024 | Hinz | G06T 3/4046 |

(Continued)

*Primary Examiner* — Wesner Sajous

(74) *Attorney, Agent, or Firm* — BakerHostetler

(57) ABSTRACT

The present disclosure describes techniques for fast personalized image generation using a machine learning model. Contextualized features are generated by a first sub-model of the machine learning model. The contextualized features are generated based on an object image and a text prompt. The object image comprises a target object. The text prompt depicts a target image and indicates at least one of changing textures of the target object or placing the target object in a particular context. Self-attention features are generated from the object image. The self-attention features contain detailed information about the target object. A target image is generated based on the contextualized features and the self-attention features by a second sub-model of the machine learning model. The second sub-model comprises context cross attention layers and object cross attention layers. The target image preserves an identity of the target object.

18 Claims, 15 Drawing Sheets

(56) References Cited

U.S. PATENT DOCUMENTS

2024/0404013 A1* 12/2024 Zhou ......................... G06T 9/00
2024/0420389 A1* 12/2024 Batra .................... G06T 11/001
2025/0095227 A1* 3/2025 Ungureanu-Contes ...................... G06T 11/00
2025/0095256 A1* 3/2025 Lungu-Stan ............ G06T 11/60
2025/0111139 A1* 4/2025 Mironica ................ G06T 11/60
2025/0117967 A1* 4/2025 Tambi ................... G06F 40/166

* cited by examiner

FIG. 5

500
Reference
Grand Canyon
Autumn
Beach
Reference
Autumn
Grand Canyon
Cobblestone

600
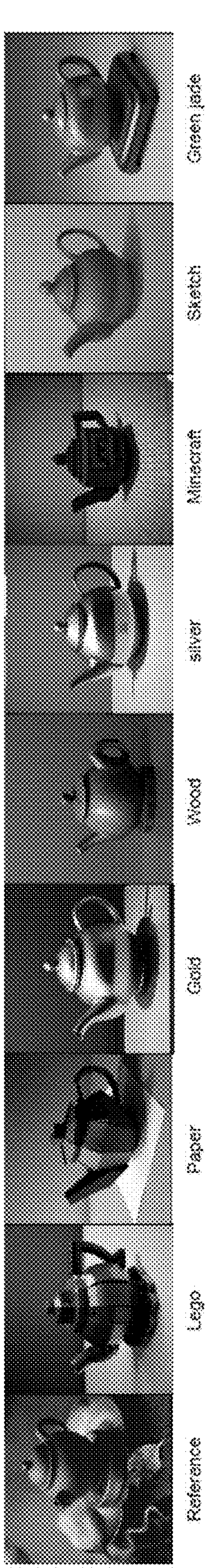
FIG. 6

700

Generate contextualized features based on an object image and a text prompt by a first sub-model of a machine learning model, wherein the object image comprises a target object, and wherein the text prompt depicts a target image and indicates at least one of changing textures of the target object or placing the target object in a particular context 702

Generate self-attention features from the object image, wherein the self-attention features contain detailed information about the target object 704

Generate a target image based on the contextualized features and the self-attention features by a second sub-model of the machine learning model, wherein the target image preserves an identity of the target object, and wherein the second sub-model comprises context cross attention layers and object cross attention layers 706

FIG. 7

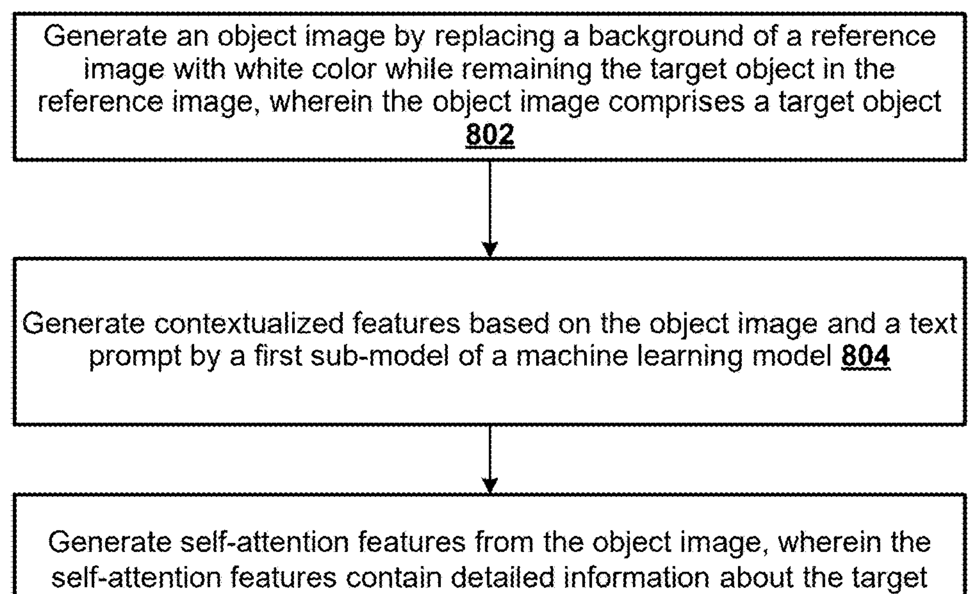
FIG. 8

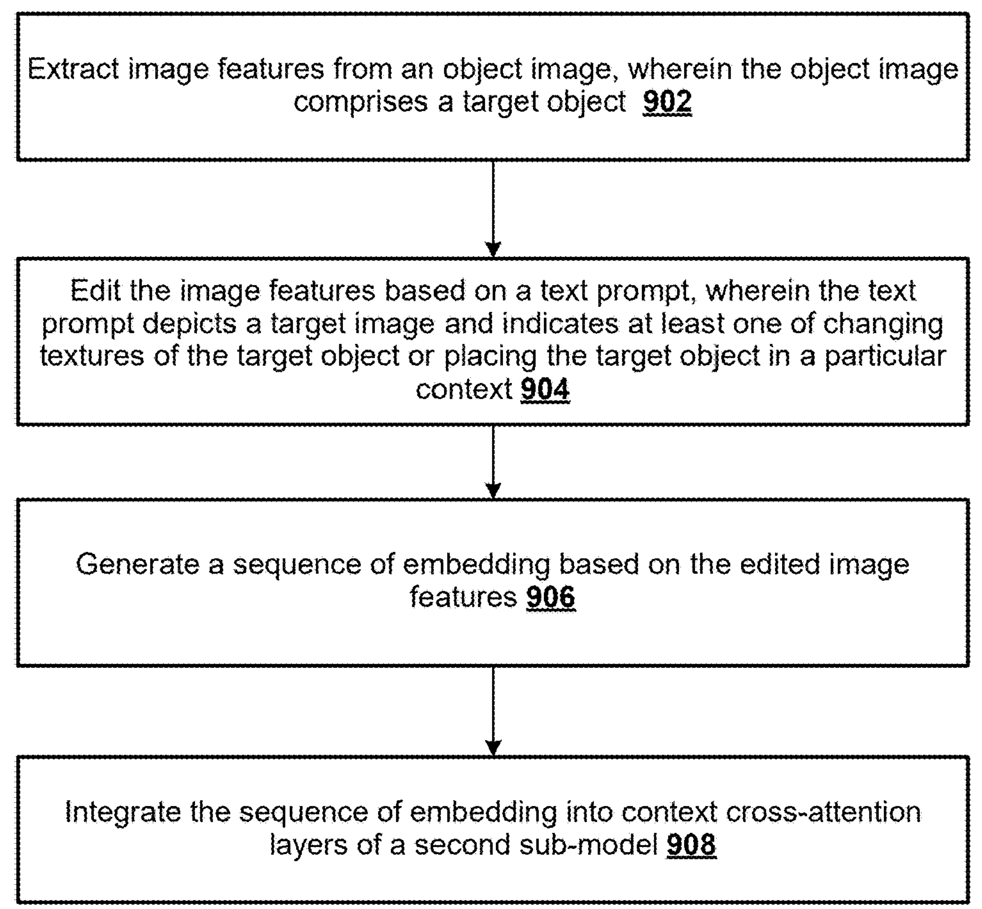
FIG. 9

1000

Generate self-attention features from an object image, wherein the object image comprises a target object, and wherein the self-attention features contain detailed information about the target object 1002

Collect and transfer the self-attention features into object cross-attention layers of a second sub-model 1004

Apply a masking mechanism during a self-attention feature transfer such that only features of a foreground in the object image are injected into a foreground of a generated image while a background of the generated image remains unaffected by the self-attention feature transfer 1006

Figure 11:
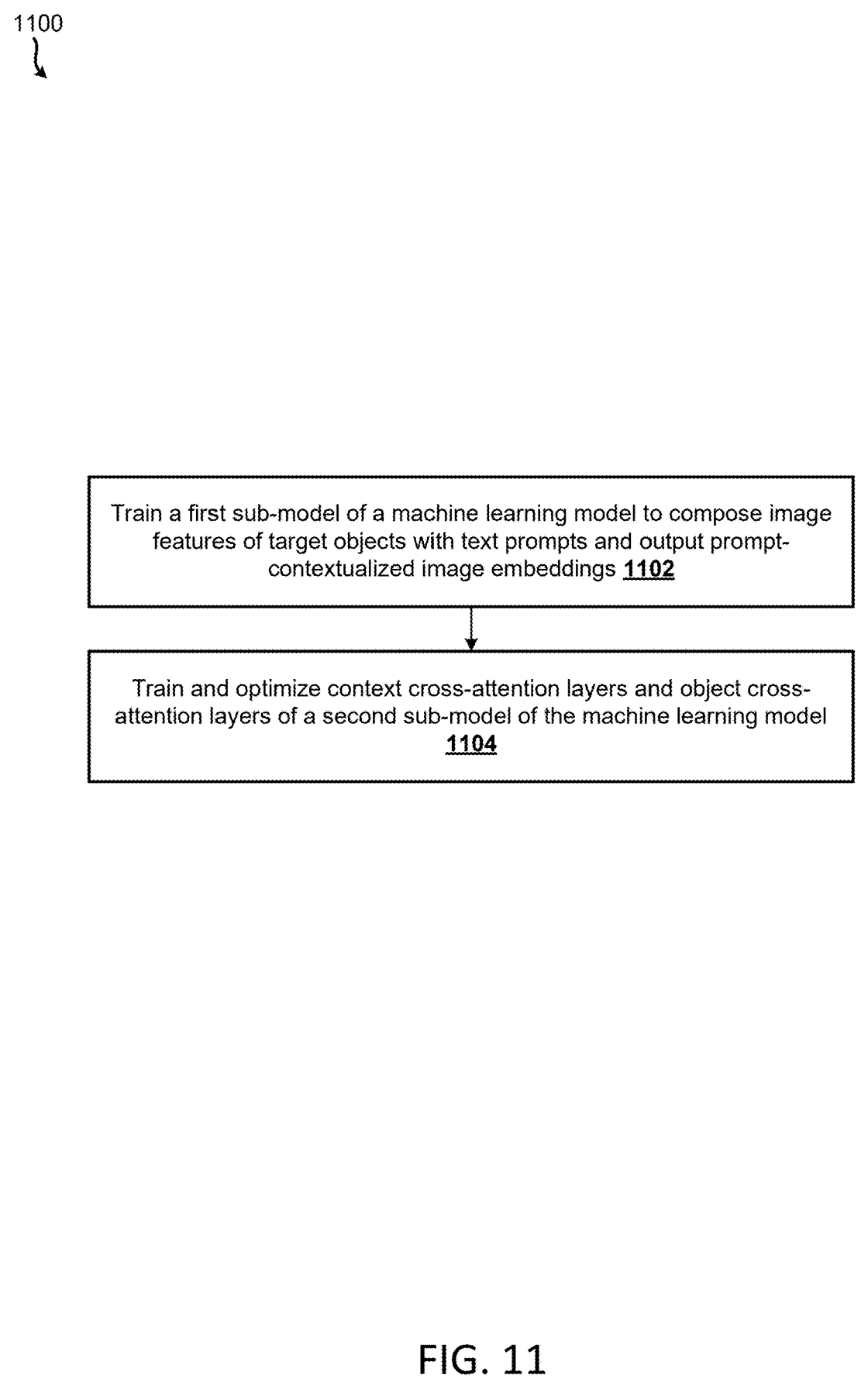

Train a first sub-model of a machine learning model to compose image features of target objects with text prompts and output prompt-contextualized image embeddings 1102

Train and optimize context cross-attention layers and object cross-attention layers of a second sub-model of the machine learning model 1104

| Methods | DINO ↑ | CLIP-T ↑ | CLIP-I ↑ |
|---|---|---|---|
| Real Images | 0.774 | 0.885 | – |
| Textual Inversion | 0.569 | 0.255 | 0.780 |
| Re-Imagen | 0.600 | 0.270 | 0.740 |
| IP-Adapter | 0.612 | 0.330 | 0.793 |
| BLIP-Diffusion | 0.594 | 0.300 | 0.779 |
| Ours | **0.618** | **0.348** | **0.803** |

FAST PERSONALIZED IMAGE GENERATION USING A MACHINE LEARNING MODEL

BACKGROUND

Machine learning models are increasingly being used across a variety of industries to perform a variety of different tasks. Such tasks may include image generation. Improved techniques for utilizing machine learning models for image generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows example images generated using a machine learning model in accordance with the present disclosure.

FIG. 6 shows example images generated using a machine learning model in accordance with the present disclosure.

FIG. 7 shows an example process for image generation using a machine learning model in accordance with the present disclosure.

FIG. 8 shows an example process for image generation using a machine learning model in accordance with the present disclosure.

FIG. 9 shows an example process for image generation using a machine learning model in accordance with the present disclosure.

FIG. 10 shows an example process for generating and transferring self-attention features in accordance with the present disclosure.

FIG. 11 shows an example process for training a machine learning model to generate images in accordance with the present disclosure.

FIG. 12 shows example quantitative evaluation results associated with image generation using a machine learning model in accordance with the present disclosure.

DETAILED DESCRIPTION OF ILLUSTRATIVE EMBODIMENTS

Image generation technology has seen remarkable advancements with the emergence of various large-scale text-to-image diffusion models. These models enable users to generate vivid images from a diverse set of text prompts.

However, the textual descriptions utilized by these text-to-image diffusion models are often unable to express detailed visual features, leading to the rise of image-conditioned generation models, which utilize images as inputs to create image variations that maintain the visual components of the reference image.

A natural progression in this field is object-driven generation or image personalization. Initial efforts in this domain involve inverting input images into textual representations and employing learnable text tokens to denote target concepts. However, these methods, regardless of their accuracy, require extensive resources for per-instance tuning and model storage, limiting their practical application. Tuning-free approaches have gained prominence for addressing these limitations. However, such tuning-free approaches still face notable constraints, such as difficulty with modifying textures, being confined to specific domains, and/or significant detail errors that require extra tuning for optimal outcomes with target objects. As such, improved techniques for image generation are needed.

Described herein are improved techniques for fast personalized image generation using a machine learning model. The machine learning model described herein is an open-vocabulary and tuning-free image personalization model that excels in detail fidelity, object identity resemblance, and coherent textual prompt integration. The machine learning model described herein harnesses the capabilities of Multimodal Large Language Models (MLLMs) to seamlessly blend text prompts with visual features of the target object, enabling alterations in both the background context and object texture. In addition, the techniques described herein utilize a self-attention shortcut that significantly enhances the detail quality with minimal computational overhead.

Figure 1:
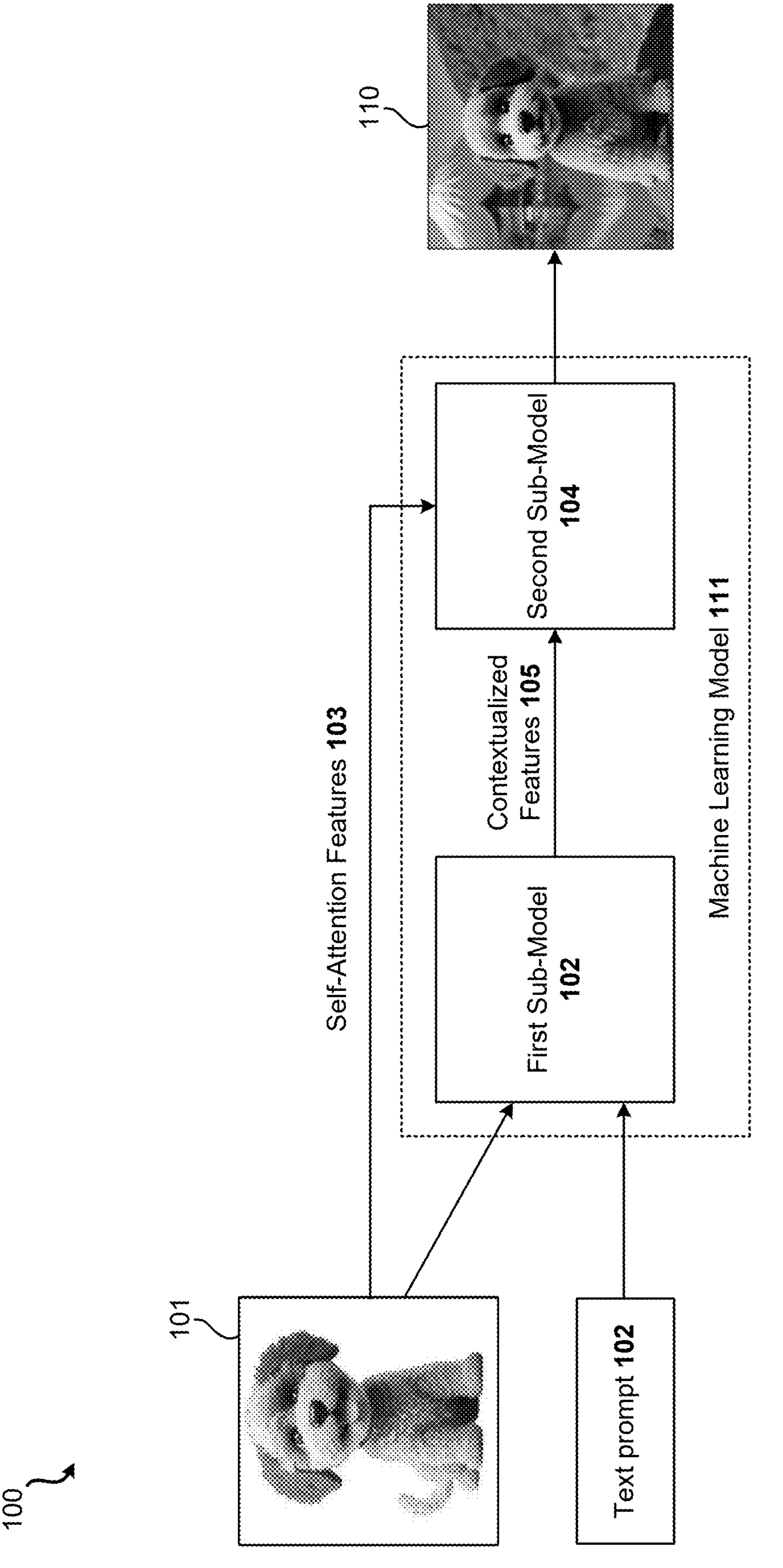
FIG. 1 shows an example system for image generation using a machine learning model in accordance with the present disclosure.

FIG. 1 illustrates an example system 100 for image generation using a machine learning model. The system 100 can include a machine learning model 111. The machine learning model 111 may include a first sub-model 106 and a second sub-model 108. The first sub-model 106 may include a generative multimodal image decoder. The second sub-model 108 can include a pretrained frozen U-Net (e.g., a fully convolutional neural network that is designed to learn from fewer training samples) with decoupled context cross-attentions. The second sub-model 108 may include context cross attention layers and object cross attention layers, such as one or more trainable context cross attention layers, one or more pretrained frozen context cross attention layers, one or more trainable object cross attention layers, and/or one or more pretrained frozen object cross attention layers.

A user may want to generate a target image based on a reference image and a text prompt. An object image 101 may be generated by replacing a background of a reference image with white color. The foreground (e.g., a target object) of the reference image may remain in the object image 101. For example, the object image 101 can comprises a target object, such as a dog, surrounded by a white color background. The text prompt 102 can depict (e.g., describe) the target image that the user wants to generate. The text prompt 102 can be generated based on user input and/or received from the user. The text prompt 102 can indicate changing textures or colors of the target object. For example, the text prompt 102 can indicate that the user wants the machine learning model 111 to generate a target image where the fur of the dog is a different color and/or curlier. The text prompt 102 can indicate placing the target object in a particular context. For example, the text prompt 102 can indicate that the user wants the machine learning model 111 to generate a target image where the dog is at a snow mountain.

The first sub-model 106 can be configured to generate contextualized features 105 based on the object image 101 and a text prompt 102. Generating the contextualized features 105 can comprise extracting semantic features from the object image 101. The image features can be edited (e.g., modified) based on the text prompt 102. A sequence of embeddings (e.g., the contextualized features 105) can be generated based on the edited image features. The contextualized features 105 can be projected to text space and then injected into the second sub-model 108. For example, the sequence of embeddings can be integrated into the context cross-attention layers of the second sub-model 108.

To further improve detail accuracy in the target image, self-attention features 103 can be generated based on the object image 101. The self-attention features 103 can be generated by a pretrained frozen U-Net (e.g., the same pretrained frozen U-Net associated with the second sub-model 108 or a different pretrained frozen U-Net). The self-attention features 103 contain detailed information about the target object (e.g., the dog). The self-attention features 103 can be collected and transferred (e.g., injected) into the second sub-model 108, such as into object cross-attention layers of the second sub-model 108. A masking mechanism can be applied during transfer of the self-attention features 103, such that only features of a foreground in the object image 101 are injected into a foreground of a generated image while a background of the generated image remains unaffected by the self-attention feature transfer.

The machine learning model 111 can generate the target image 110. The machine learning model 111 can generate the target image 110 based on the contextualized features 105 and the self-attention features 103. The second sub-model 108 can generate the target image 110 based on the contextualized features 105 and the self-attention features 103. The target image 110 can preserve an identity of the target object, such as the dog.

The machine learning model 111 can be trained using a two-staged training pipeline. The first stage of the two-staged training pipeline may comprise training the first sub-model 106 to compose image features of target objects with text prompts and output prompt-contextualized image embeddings. The second stage of the two-staged training pipeline may comprise jointly optimizing newly added attention modules in the second sub-model 108. For example, the second stage of the two-staged training pipeline may comprise training and optimizing the context cross-attention layers and the object cross-attention layers of the second sub-model 108.

Figure 2:
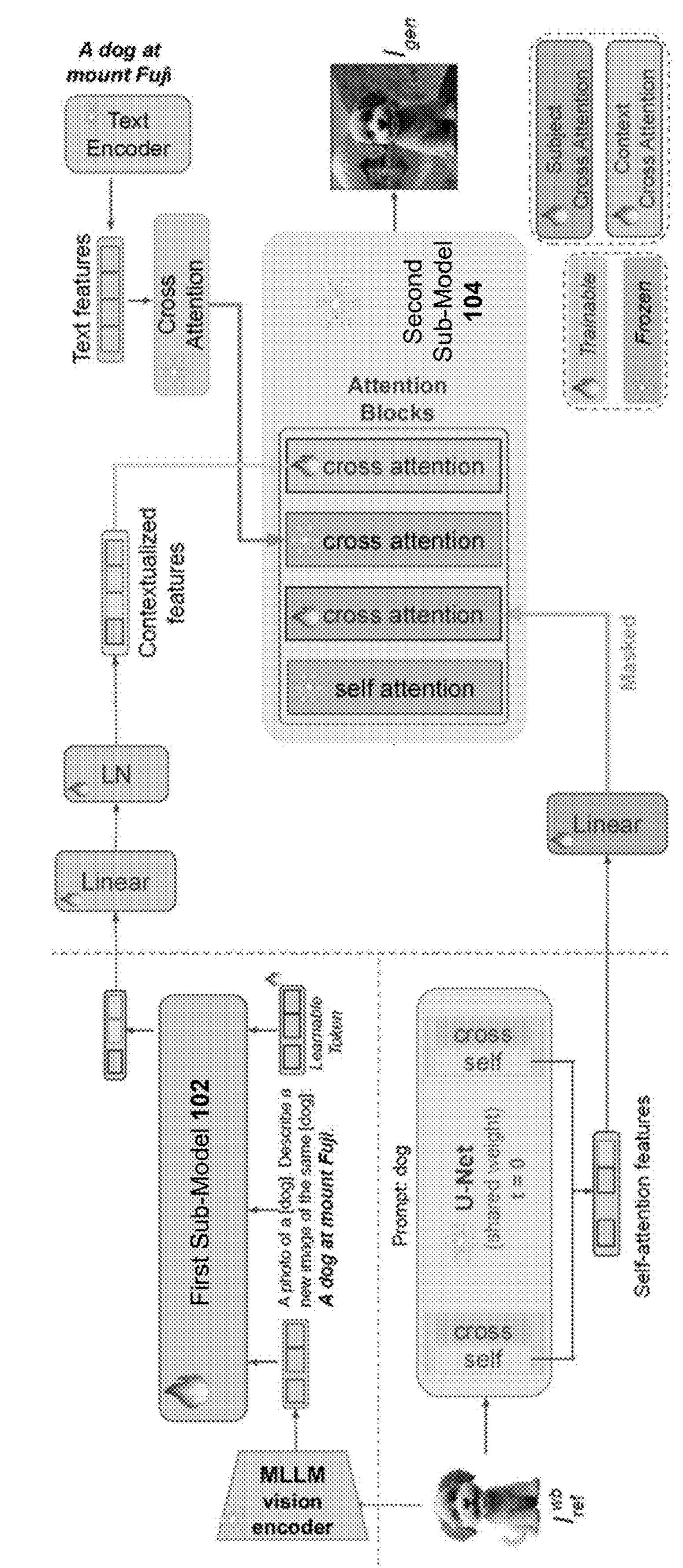
FIG. 2 shows an example system for image generation using a machine learning model in accordance with the present disclosure.

FIG. 2 shows a more detailed system 200 including the first sub-model 106 and the second sub-model 108. The system 200 is a multimodal large language model (LLM) adapter system enhanced by fine-grained feature transfer. The first sub-model 106 can include a generative multimodal decoder that is utilized to extract image features from a reference image and edit the image features following the target prompt, yielding the contextualized image features. The background of the original reference image can be replaced by a white color, leaving only object pixels. Self-attention layers of a U-Net can be leveraged to extract the object image self-attention features. The contextualized image features and the object image self-attention features can be injected into the second sub-model 108 (e.g., a U-Net diffusion model) for generation of the target image.

The first sub-model 106 may include a multimodal generative image-feature decoder. The first sub-model 106 may actively generate target image features by combining visual information from a reference image and textual information from a text prompt. A pre-trained multimodal large language model (MLLM) may be adapted to serve as the multimodal generative image-feature decoder. Given a reference image $I_{ref}$ and its object mask $M_{ref}$, a white-background reference image, $$I_{ref}^{wb},$$

may be generated based on $$I_{ref}^{wb} = I_{ref} \times M_{ref}.$$

An instruction sequence may be generated. The instruction sequence may be input to the first sub-model 106. The instruction sequence may be generated based on the following prompt structure: "$\langle f_{ref} \rangle$ An image of $\langle$label$\rangle$ Describe $\langle P_{tgt} \rangle$," where label is the target object (e.g., object keyword), such as dog, cat, car, etc., and $P_{tgt}$ is the target prompt or text prompt. A learnable token can be appended at the end of the instruction sequence. An embedding corresponding to the learnable token may be the output of the first sub-model 106. The first sub-model 106 can edit the background-excluded image feature of the white-background reference image, $$I_{ref}^{wb},$$

following a background-included target prompt $P_{tgt}$ that describes an entire image.

The generated image feature from the first sub-model 106 can be converted into a sequence of embeddings in $\mathbb{R}^{768}$ with length N (e.g., N=4) through a linear layer. The embedding sequence can be integrated into the second sub-model 108 with decoupled cross-attention.

To further enhance the detail faithfulness, self-attention features generated based on the object image may be used and a masking mechanism may be applied. Specifically, a pre-trained U-Net can be leveraged as the self-attention feature extractor.

$$I_{ref}^{wb}$$

can be forwarded through the diffusion U-Net with t=0 as timestep and a label as the text condition. Features at each self-attention layer can be collected and transferred into the second sub-model 108 by the adapted modules with decoupled self-attention. The self-attention feature transfer is an effective information shortcut as the extracted feature $c_i$ carries fine-grained details. However, directly applying it can cause interference between the backgrounds of $$I_{ref}^{wb}$$

and $I_{gen}$. To address this issue, a self-attention masking procedure can be used. Ideally, only the features of the foreground in $$I_{ref}^{wb}$$

are injected into the foreground of $I_{gen}$. The features of the background in $$I_{ref}^{wb}$$

should be eliminated and the background of $I_{gen}$ should remain unaffected by the self-attention feature transfer. The masking mechanism may be applied using the reference image mask $M_{ref}$ and the generated image mask $M_{gen}$. The output of our modified self-attention can be written as follows:

$$Z_{new} = Attn(Q, K, V) + \lambda \cdot Attn(Q, K', V', M_{ref}) \cdot M_{gen} \cdot \beta$$

where λ is a learnable parameter, and K' and V' are the key and values calculated from the extracted self-attention feature $c_i$ by $$K' = c_i W_k' \text{ and } V' = c_i W_v'.$$

Here, $$W_k'$$

and $$W_v'$$

are the weight matrices of the newly introduced decoupled object-cross-attention projections. The reference image mask $M_{ref}$ can be applied inside of Attn in the form of the attention mask, and the generation mask $M_{gen}$ can be applied through an element-wise product. β is a strength scalar for additional controls.

Figure 3:
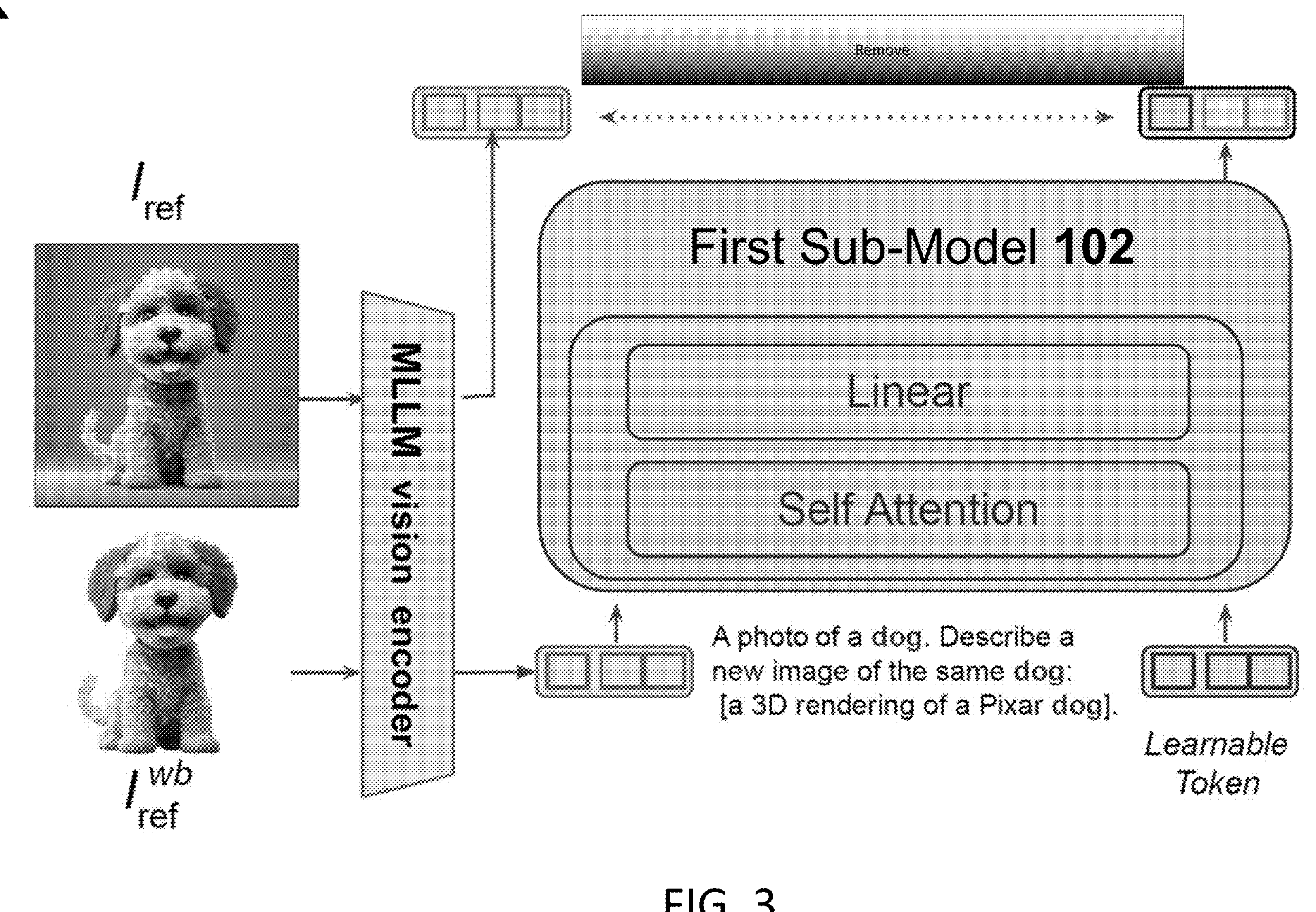
FIG. 3 shows an example system for training a machine learning model in accordance with the present disclosure.

As shown in the system 300 of FIG. 3, during training, the machine learning model is optimized to reconstruct the background-included reference image $I_{ref}$. The white-background reference image $$I_{ref}^{wb}$$

and the target image $I_{ref}$ may share the same mask, so $M_{ref}$=$M_{gen}$. During inference, the ground truth $M_{ref}$ is available, but the ground truth $M_{gen}$ isn't. The cross-attention map corresponding to the object label can be used to approximate $M_{gen}$. During each denoising step, the attention map of the label from each cross-attention layer can be extracted and averaged into $M_{gen(t)}$. The attention map can be used to approximate $M_{gen}$ in the next denoising step.

Unlike existing techniques that extract features of the target object as it is, the machine learning model described herein generates image features that are well-modified following the target text prompt. Existing techniques inject image features into the cross-attention layers of the U-Net without interacting with the target prompt. This is problematic, especially when the target prompt involves texture-changing the target object. On the other hand, the first sub-model 106 imagines the full image given a white-background object image and a text prompt describing the full image, which dramatically improves model performance, especially in changing object textures (e.g., textures of a target object). It ensures the output target image preserves the identity of the target object while respecting the text prompt. To achieve the best model performance, the machine learning model described herein can be trained using a two-staged pre-training strategy.

Figure 4:
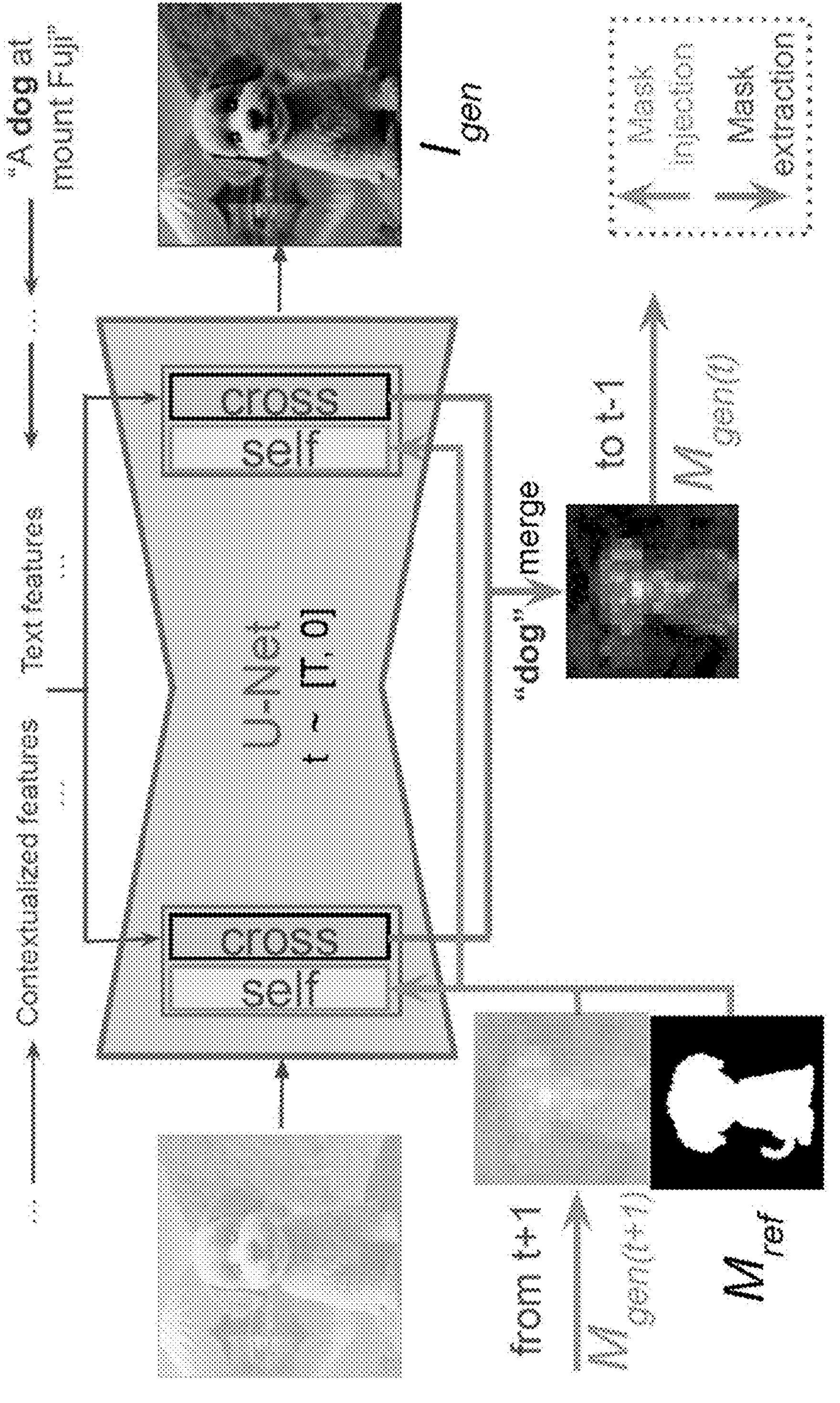
FIG. 4 shows an example system for training a machine learning model in accordance with the present disclosure.

The first stage of the pre-training strategy can be a multimodal generative learning stage, where the first sub-model 106 is trained such that it learns to compose image features of the subject with the target prompt and output the CLIP embedding of the target image. To this end, the generative capability of the MLLM is utilized: while initially trained to generate text, the MLLM can be adapted to generate image embeddings. As shown in the system 400 of FIG. 4, $$I_{ref}^{wb}$$

can be encoded by an MLLM vision encoder and combined with its caption $P_{ref}$, together with a learnable token, into a prompt instruction. This sequence can be fed into the MLLM. The MLLM can be a 15-layer transformer. The output of the learnable token can be trained to match the CLIP image embedding of the original reference image $I_{ref}$. Once trained, the MLLM can generate prompt-contextualized image embeddings. The loss function of this stage can be formulated as:

$$M_{MLLM} = \left\| MLLM\left(\text{CLIP}\left(I_{ref}^{wb}\right), P_{ref}, \text{Token}\right) - \text{CLIP}(I_{ref}) \right\|_2^2$$

The second stage of the pre-training strategy can be a diffusion learning stage that faithfully converts the contextualized image embeddings to an image. During this stage, the MLLM and the pre-trained diffusion model of the first sub-model 106 are frozen. Only the decoupled object and contextual attentions and their linear mappings are optimized. The model can be trained, for example, on the OpenImage dataset, using the following training objective:

$$L = E_{z_t, t, C, \varepsilon \sim N(0,1)}\left[ \| \varepsilon - \varepsilon_\theta(z_t, t, C) \|_2^2 \right].$$

where C denotes the textual embedding of prompts extracted by a pre-trained CLIP text encoder. Classifier-free guidance (CFG) can improve diffusion generation quality. For example, CFG enabled for the context-cross-attention side and not on the object-cross-attention side may improve diffusion generation quality. Specifically, in the second training stage, CFG can be enabled on the context-cross-attention side, and the contextualized features can be randomly replaced with an all-zero image embedding.

FIG. 5 shows example images 500 generated using the machine learning model 111 in accordance with the present disclosure. With just one reference image of a target object (e.g., the boot, or the teapot), the machine learning model 111 model can generate text-aligned, identity-preserved new images of the same target object (e.g., the boot, or the teapot) with only a single forward pass. As shown in FIG. 5, the machine learning model 111 supports both re-contextualization, where the same target object is located in a new environment, and changing the texture of the object itself. As shown in FIG. 5, the machine learning model 111 seamlessly generates a high-quality background while precisely situating the same object within a new setting.

FIG. 6 shows more example images 600 generated using the machine learning model 111 in accordance with the present disclosure. The first column of FIG. 6 shows reference image(s) comprising target object(s) (e.g., the teapot). The second column shows identity-preserved new images of the same target object with a "Lego" texture (e.g., based on a Lego text prompt). The third column shows identity-preserved new images of the same target object with a "paper" texture (e.g., based on a paper text prompt). The fourth column shows identity-preserved new images of the same target object with a "gold" texture and/or color (e.g., based on a gold text prompt). The fifth column shows identity-preserved new images of the same target object with a "wood" texture (e.g., based on a wood text prompt). The sixth column shows identity-preserved new images of the same target object with a "silver" texture and/or color (e.g., based on a silver text prompt). The seventh column shows identity-preserved new images of the same target object with a "Minecraft" theme (e.g., based on a Minecraft text prompt). The eighth column shows identity-preserved new images of the same target object as sketches (e.g., based on a sketch text prompt). The last column shows identity-preserved new images of the same target object with a "green jade" texture and/or color (e.g., based on a green jade text prompt). As shown in FIG. 6, the machine learning model 111 is able to render realistic textures in response to textual cues, adeptly altering specified visual elements while leaving other identity aspects of the image unaffected.

FIG. 7 illustrates an example process 700 for image generation using a machine learning model. Although depicted as a sequence of operations in FIG. 7, those of ordinary skill in the art will appreciate that various embodiments may add, remove, reorder, or modify the depicted operations.

An object image can depict a target object, such as a dog, surrounded by a white color background. A text prompt can depict (e.g., describe) a target image that the user wants to generate. The text prompt can indicate changing textures or colors of the target object. For example, the text prompt can indicate that the user wants to generate a target image where the fur of the dog is a different color and/or curlier. The text prompt can indicate placing the target in a particular context. For example, the text prompt can indicate that the user wants to generate a target image where the dog is at a snow mountain.

At 702, contextualized features may be generated. The contextualized features may be generated based on the object image and the text prompt. The contextualized features may be generated by a first sub-model of a machine learning model (e.g., the first sub-model 106). Generating the contextualized features can comprise extracting semantic features from the object image and editing the image features based on the text prompt. The contextualized features can be projected to text space and then injected into a second sub-model of the machine learning model. The second sub-model (e.g., the second sub-model 108) may comprise context cross attention layers and object cross attention layers.

To further improve detail accuracy in the target image, self-attention features can be generated based on the object image. At 704, self-attention features may be generated from the object image. The self-attention features may contain detailed information about the target object. The self-attention features can be collected and transferred (e.g., injected) into the second sub-model. The second sub-model may generate the target image. At 706, a target image may be generated. The target image may be generated based on the contextualized features and the self-attention features. The target image can preserve an identity of the target object, such as the dog.

FIG. 8 illustrates an example process 800 for image generation using a machine learning model. Although depicted as a sequence of operations in FIG. 8, those of ordinary skill in the art will appreciate that various embodiments may add, remove, reorder, or modify the depicted operations.

A user may want to generate a target image based on a reference image and a text prompt. At 802, an object image may be generated. The object image may be generated by replacing a background of a reference image with white color while remaining the target object in the reference image. The foreground (e.g., the target object) of the reference image may remain the object image. For example, the object image can depict the target object, such as a dog, surrounded by a white color background.

A text prompt can depict (e.g., describe) the target image that the user wants to generate. The text prompt can indicate changing textures or colors of the target object. For example, the text prompt can indicate that the user wants to generate a target image where the fur of the dog is a different color and/or curlier. The text prompt can indicate placing the target in a particular context. For example, the text prompt can indicate that the user wants to generate a target image where the dog is at a snow mountain.

At 804, contextualized features may be generated. The contextualized features may be generated based on the object image and the text prompt. The contextualized features may be generated by a first sub-model of a machine learning model (e.g., the first sub-model 106). Generating the contextualized features can comprise extracting semantic features from the object image and editing the image features based on the text prompt. The contextualized features can be projected to text space and then injected into a second sub-model of the machine learning model (e.g., the second sub-model 108). The second sub-model may comprise context cross attention layers and object cross attention layers. To further improve detail accuracy in the target image, self-attention features can be generated based on the object image. At 806, self-attention features may be generated from the object image. The self-attention features may contain detailed information about the target object. The self-attention features can be collected and transferred (e.g., injected) into the second sub-model. The second sub-model may generate the target image.

FIG. 9 illustrates an example process 900 for image generation using a machine learning model. Although depicted as a sequence of operations in FIG. 9, those of ordinary skill in the art will appreciate that various embodiments may add, remove, reorder, or modify the depicted operations.

A first sub-model of a machine learning model (e.g., the first sub-model 106) may generate target image features by combining visual information from a reference image and textual information from a text prompt. an object image may be generated. The object image may be generated by replacing a background of a reference image with white color while keeping the target object in the reference image.

At 902, image features (e.g., semantic features) may be extracted. The image features may be extracted from the object image. The object image may comprise the target object. The image features can be edited (e.g., modified) based on a text prompt. At 904, the image features may be edited based on a text prompt. The text prompt may depict (e.g., describe) a target image. The text prompt may indicate at least one of changing textures of the target object or placing the target object in a particular context. At 906, a sequence of embeddings can be generated based on the edited image features. The sequence of embeddings can be projected to text space and then injected into a second sub-model of the machine learning model (e.g., the second sub-model 108). At 908, the sequence of embeddings may be integrated into context cross-attention layers of the second sub-model.

FIG. 10 illustrates an example process 1000 for generating and transferring self-attention features in accordance with the present disclosure. Although depicted as a sequence of operations in FIG. 10, those of ordinary skill in the art will appreciate that various embodiments may add, remove, reorder, or modify the depicted operations.

At 1002, self-attention features may be generated. The self-attention features may be generated from (e.g., based on) an object image. The object image can comprise a target object. The self-attention features can contain detailed information about the target object. At 1004, the self-attention features may be collected. The collected self-attention features may be transferred into object cross-attention layers of a second sub-model (e.g., the second sub-model 108). At 1006, a masking mechanism may be applied during a self-attention feature transfer such that only features of a foreground in the object image are injected into a foreground of a generated image while a background of the generated image remains unaffected by the self-attention feature transfer.

FIG. 11 illustrates an example process 1100 for training a machine learning model to generate images. Although depicted as a sequence of operations in FIG. 11, those of ordinary skill in the art will appreciate that various embodiments may add, remove, reorder, or modify the depicted operations.

A machine learning model can be trained using a two-staged training pipeline. The first stage of the two-staged training pipeline may comprise training the first sub-model. At 1102, a first sub-model of the machine learning model may be trained. The first sub-model may be trained to compose image features of target objects with text prompts and output prompt-contextualized image embeddings. The second stage of the two-staged training pipeline may be associated with a second sub-model of the machine learning model. At 1104, context cross-attention layers and object cross-attention layers of the second sub-model may be trained and optimized.

To train the machine learning model described herein, a dataset of 282K image/caption/image-mask triplets was constructed from the OpenImage-V7 dataset. Captions were generated for the images, then color, shape, and texture keywords were filtered out of the captions. The object mask provided in OpenImage was used as $M_{ref}$. Evaluation images do not come with a mask, so SAM was used to extract main objects and build masks thereafter. Stable Diffusion v1.5 with Realistic Vision was used as a checkpoint as the foundation diffusion model. LLaVA-7B was used as the MLLM decoder in stage-one training. In stage-two training, IP-Adapter checkpoints were loaded to initialize our context cross-attention layers, and the object cross-attention layers were zero-initialized. The performance of the model was evaluated using various images and prompts.

A comparative analysis was conducted to evaluate the performance of the techniques described herein against existing tuning-free open-vocabulary personalization approaches. For recontextualization, a variety of prompts and images were used to qualitatively assess the machine learning model described herein. To ensure a fair comparison, 50 random samples were generated for each model and the highest quality examples were compared against each other. The results show that the machine learning model described herein generates images that have significantly more accurate details for context editing and better balancing between prompt and image fidelity in texture editing. Particularly, the marbled eyes and facial details in the cat images are notably refined.

The backgrounds generated by the machine learning model described herein also exhibit enhanced appeal, diversity, and realism, a benefit attributed to our masked cross-attention mechanism. In texture editing, the images generated by the machine learning model described herein consistently maintain the shape and contour of objects while adapting them to eight different textures. This contrasts with baseline methods, which often struggle to balance the prompts and images effectively. The images generated by the machine learning model described herein indicate a marked improvement in texture adaptation while preserving the integrity of the original objects.

A quantitative analysis was conducted to evaluate the performance of the techniques described herein. The Dreambooth dataset and online images were used for the quantitative evaluation. For a fair comparison, four images conditioned on the image prompt were generated for each dataset sample, resulting in 14000 generated images for each method. Object fidelity in the generated images was evaluated using DINO and CLIP-I scores, and prompt-following ability using CLIP-T scores. The results are shown in the table 1200 of FIG. 12. As shown in the table 1200, the machine learning model described herein shows a significant performance boost across these metrics, especially in prompt-following.

The contextualized features derived from our MLLM predominantly cater to semantic understanding and the general appearance, but they inherently lack fine-grained details. To address this, an object-cross-attention feature transfer mechanism was introduced, coupled with a masking procedure. This combination serves as a vital component for enhancing detail fidelity. The effectiveness of the attention module's feature transfer ability was evaluated. The results show that, when $\beta=0$, object-cross-attention is disabled, and the model entirely relies on the multimodal decoder and its context-cross-attention injection. The generated objects in the result images are similar to the references in shape and color, but the details are mistaken. As $\beta$ increases, consistent improvement in detail fidelity is observed. For example, the cat/dog results change from photorealism to Pixar style, and the robot/bird becomes more accurate in our method. Zoom-in images for the car are shown to highlight how the shape and light of the car headlight gradually become accurate as $\beta$ increases.

Figure 13:
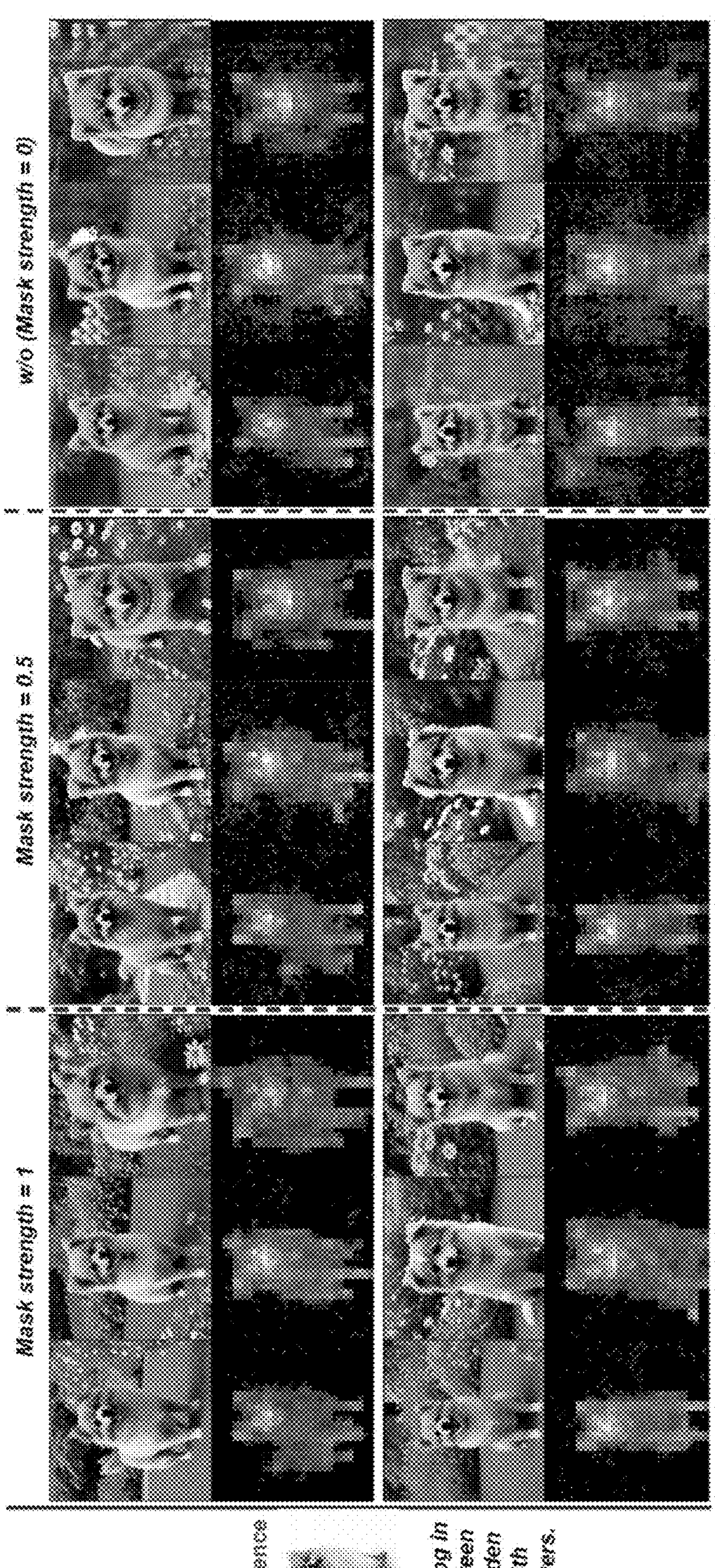
FIG. 13 shows an example effect of iterative masking in accordance with the present disclosure.

The effectiveness of the masking mechanism described herein was evaluated. As mentioned previously, since $M_{gen}$ is unknown at generation time, the object-cross-attention masking itself is adapted to an iterative masking manner. As shown in the diagram 1300 of FIG. 13, this design ensures the generated backgrounds are unaffected by the self-attention feature transfer and greatly improves image quality. The cross-attention map $M_{gen(t=0)}$ for the keyword label (in this case, dog) was visualized after the last denoising step. As shown in the diagram 1300, $M_{gen(0)}$ is noisy and inaccurate without masking. When it is fully activated, $M_{gen(0)}$ becomes clean and clear and the approximation to $M_{gen}$ becomes accurate. This shows that the masking technique described herein is crucial and effective to ensure clear and diverse image backgrounds.

Figure 14:
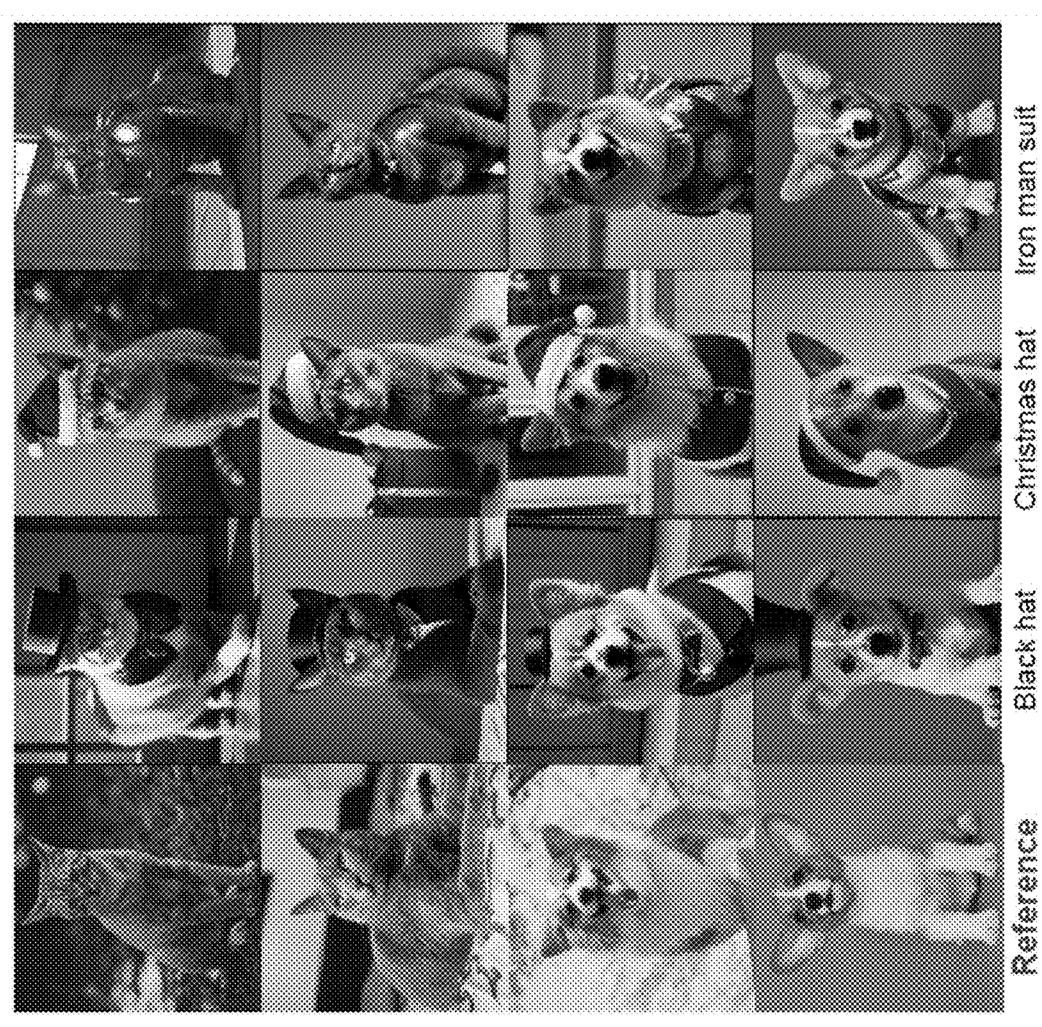
FIG. 14 shows example results of image generation using a machine learning model in accordance with the present disclosure.

The performance of the machine learning model 111 on more problem settings in addition to the previous results was also evaluated. As shown in example images 1400 of FIG. 14, the machine learning model 111 generates high-quality object-coherent images across diverse problem settings, including accessory incorporation, pose modification, and camera perspective controls. This shows it can faithfully generate object details while allowing flexibility in prompts. Additionally, the machine learning model 111 is a universal adapter because the original diffusion model is frozen in the training stage. The machine learning model 111 can generalize to the custom model checkpoints fine-tuned from the same base model. This was verified on community models from HuggingFace and CivitAi including Realistic Vision V4.0, ReV-Animated, Anything v4 and Esthetic Retro Anime. These community models are all fine-tuned from SD v1.5. The machine learning model 111 can be directly applied to these community models without any modification.

Figure 15:
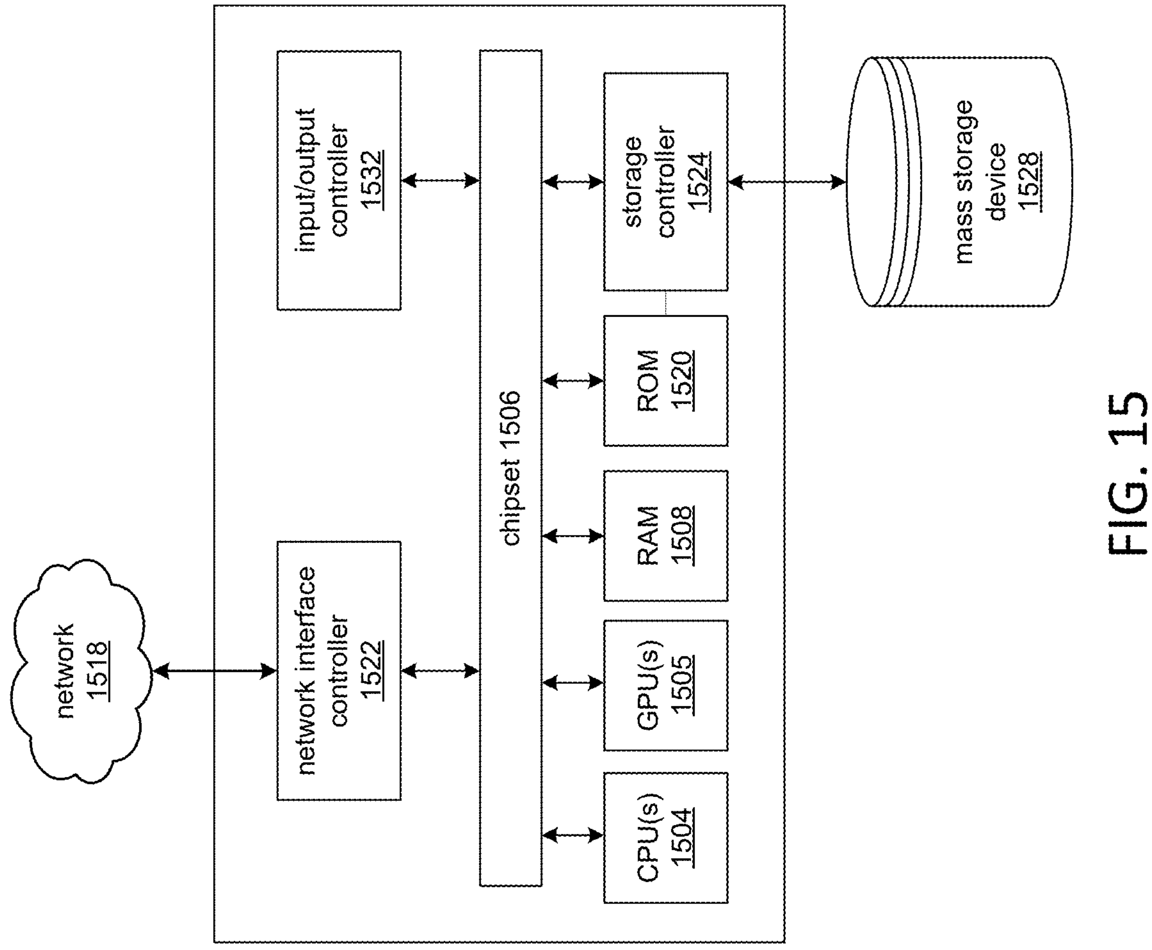
FIG. 15 shows an example computing device which may be used to perform any of the techniques disclosed herein.

FIG. 15 illustrates a computing device that may be used in various aspects, such as the models, components, and/or devices depicted in any of FIGS. 1-4. With regard to FIGS. 1-4, any or all of the components may each be implemented by one or more instance of a computing device 1500 of FIG. 15. The computer architecture shown in FIG. 15 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1500 may include a baseboard, or "motherboard," which is a printed circuit board to which a multitude of components or devices may be connected by way of a system bus or other electrical communication paths. One or more central processing units (CPUs) 1504 may operate in conjunction with a chipset 1506. The CPU(s) 1504 may be standard programmable processors that perform arithmetic and logical operations necessary for the operation of the computing device 1500.

The CPU(s) 1504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1504 may be augmented with or replaced by other processing units, such as GPU(s) 1505. The GPU(s) 1505 may comprise processing units specialized for but not necessarily limited to highly parallel computations, such as graphics and other visualization-related processing.

A chipset 1506 may provide an interface between the CPU(s) 1504 and the remainder of the components and devices on the baseboard. The chipset 1506 may provide an interface to a random-access memory (RAM) 1508 used as the main memory in the computing device 1500. The chipset 1506 may further provide an interface to a computer-readable storage medium, such as a read-only memory (ROM) 1520 or non-volatile RAM (NVRAM) (not shown), for storing basic routines that may help to start up the computing device 1500 and to transfer information between the various components and devices. ROM 1520 or NVRAM may also store other software components necessary for the operation of the computing device 1500 in accordance with the aspects described herein.

The computing device 1500 may operate in a networked environment using logical connections to remote computing nodes and computer systems through local area network (LAN). The chipset 1506 may include functionality for providing network connectivity through a network interface controller (NIC) 1522, such as a gigabit Ethernet adapter. A NIC 1522 may be capable of connecting the computing device 1500 to other computing nodes over a network 1518. It should be appreciated that multiple NICs 1522 may be present in the computing device 1500, connecting the computing device to other types of networks and remote computer systems.

The computing device 1500 may be connected to a mass storage device 1528 that provides non-volatile storage for the computer. The mass storage device 1528 may store system programs, application programs, other program modules, and data, which have been described in greater detail herein. The mass storage device 1528 may be connected to the computing device 1500 through a storage controller 1524 connected to the chipset 1506. The mass storage device 1528 may consist of one or more physical storage units. The mass storage device 1528 may comprise a management component 1510. A storage controller 1524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1500 may store data on the mass storage device 1528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1528 is characterized as primary or secondary storage and the like.

For example, the computing device 1500 may store information to the mass storage device 1528 by issuing instructions through a storage controller 1524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1500 may further read information from the mass storage device 1528 by detecting the physical states or characteristics of one or more particular locations within the physical storage units.

In addition to the mass storage device 1528 described above, the computing device 1500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1500.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1528 depicted in FIG. 15, may store an operating system utilized to control the operation of the computing device 1500. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1528 may store other system or application programs and data utilized by the computing device 1500.

The mass storage device 1528 or other computer-readable storage media may also be encoded with computer-executable instructions, which, when loaded into the computing device 1500, transforms the computing device from a general-purpose computing system into a special-purpose computer capable of implementing the aspects described herein. These computer-executable instructions transform the computing device 1500 by specifying how the CPU(s) 1504 transition between states, as described above. The computing device 1500 may have access to computer-readable storage media storing computer-executable instructions, which, when executed by the computing device 1500, may perform the methods described herein.

A computing device, such as the computing device 1500 depicted in FIG. 15, may also include an input/output controller 1532 for receiving and processing input from a number of input devices, such as a keyboard, a mouse, a touchpad, a touch screen, an electronic stylus, or other type of input device. Similarly, an input/output controller 1532 may provide output to a display, such as a computer monitor, a flat-panel display, a digital projector, a printer, a plotter, or other type of output device. It will be appreciated that the computing device 1500 may not include all of the components shown in FIG. 15, may include other components that are not explicitly shown in FIG. 15, or may utilize an architecture completely different than that shown in FIG. 15.

As described herein, a computing device may be a physical computing device, such as the computing device 1500 of FIG. 15. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating images using a machine learning model, comprising:

generating contextualized features based on an object image and a text prompt by a first sub-model of the machine learning model, wherein the object image comprises a target object, and wherein the text prompt depicts a target image and indicates at least one of changing textures of the target object or placing the target object in a particular context;

generating self-attention features from the object image, wherein the self-attention features contain detailed information about the target object;

generating the target image based on the contextualized features and the self-attention features by a second sub-model of the machine learning model, wherein the target image preserves an identity of the target object, and wherein the second sub-model comprises context cross attention layers and object cross attention layers;

wherein the method further comprises:

collecting and transferring the self-attention features into the object cross-attention layers of the second sub-model; and applying a masking mechanism during a self-attention feature transfer such that only features of a foreground in the object image are injected into a foreground of a generated image while a background of the generated image remains unaffected by the self-attention feature transfer.

2. The method of claim 1, further comprising:

generating the object image by replacing a background of a reference image with white color while remaining the target object in the reference image.

3. The method of claim 1, wherein the generating contextualized features based on an object image and a text prompt by a first sub-model of the machine learning model comprises:

extracting image features from the object image;

editing the image features based on the text prompt; and generating a sequence of embedding based on the edited image features.

4. The method of claim 3, further comprising:

integrating the sequence of embedding into the context cross-attention layers of the second sub-model.

5. The method of claim 1, further comprising:

training the machine learning model using a two-staged training pipeline.

6. The method of claim 5, further comprising:

training the first sub-model to compose image features of target objects with text prompts and output prompt-contextualized image embeddings.

7. The method of claim 6, further comprising:

training and optimizing the context cross-attention layers and the object cross-attention layers of the second sub-model.

8. A computing system of generating images using a machine learning model, comprising:

at least one processor; and at least one non-transitory memory communicatively coupled to the at least one processor and comprising computer-readable instructions that upon execution by the at least one processor cause the at least one processor to perform operations comprising:

generating contextualized features based on an object image and a text prompt by a first sub-model of the machine learning model, wherein the object image comprises a target object, and wherein the text prompt depicts a target image and indicates at least one of changing textures of the target object or placing the target object in a particular context;

generating self-attention features from the object image, wherein the self-attention features contain detailed information about the target object;

generating the target image based on the contextualized features and the self-attention features by a second sub-model of the machine learning model, wherein the target image preserves an identity of the target object, and wherein the second sub-model comprises context cross attention layers and object cross attention layers;

wherein the operations further comprise:

collecting and transferring the self-attention features into the object cross-attention layers of the second sub-model; and applying a masking mechanism during a self-attention feature transfer such that only features of a foreground in the object image are injected into a foreground of a generated image while a background of the generated image remains unaffected by the self-attention feature transfer.

9. The computing system of claim 8, the operations further comprising:

generating the object image by replacing a background of a reference image with white color while remaining the target object in the reference image.

10. The computing system of claim 8, wherein the generating contextualized features based on an object image and a text prompt by a first sub-model of the machine learning model comprises:

extracting image features from the object image;

editing the image features based on the text prompt; and generating a sequence of embedding based on the edited image features.

11. The computing system of claim 8, the operations further comprising:

training the first sub-model to compose image features of target objects with text prompts and output prompt-contextualized image embeddings; and training and optimizing the context cross-attention layers and the object cross-attention layers of the second sub-model.

12. The computing system of claim 8, the operations further comprising:

training the machine learning model using a two-staged training pipeline.

13. A non-transitory computer-readable storage medium, storing computer-readable instructions that upon execution by a processor cause the processor to implement operations comprising:

generating contextualized features based on an object image and a text prompt by a first sub-model of the machine learning model, wherein the object image comprises a target object, and wherein the text prompt depicts a target image and indicates at least one of changing textures of the target object or placing the target object in a particular context;

generating self-attention features from the object image, wherein the self-attention features contain detailed information about the target object;

generating the target image based on the contextualized features and the self-attention features by a second sub-model of the machine learning model, wherein the target image preserves an identity of the target object, and wherein the second sub-model comprises context cross attention layers and object cross attention layers;

wherein the operations further comprise:

collecting and transferring the self-attention features into the object cross-attention layers of the second sub-model; and applying a masking mechanism during a self-attention feature transfer such that only features of a foreground in the object image are injected into a foreground of a generated image while a background of the generated image remains unaffected by the self-attention feature transfer.

14. The non-transitory computer-readable storage medium of claim 13, wherein the generating contextualized features based on an object image and a text prompt by a first sub-model of the machine learning model comprises:

extracting image features from the object image;

editing the image features based on the text prompt; and generating a sequence of embedding based on the edited image features.

15. The non-transitory computer-readable storage medium of claim 14, the operations further comprising:

integrating the sequence of embedding into the context cross-attention layers of the second sub-model.

16. The non-transitory computer-readable storage medium of claim 13, the operations further comprising:

training the first sub-model to compose image features of target objects with text prompts and output prompt-contextualized image embeddings; and training and optimizing the context cross-attention layers and the object cross-attention layers of the second sub-model.

17. The non-transitory computer-readable storage medium of claim 13, the operations further comprising:

generating the object image by replacing a background of a reference image with white color while remaining the target object in the reference image.

18. The non-transitory computer-readable storage medium of claim 13, the operations further comprising:

training the machine learning model using a two-staged training pipeline.

* * * * *